United States Patent [19]

Liskey

[11] Patent Number: 4,925,465
[45] Date of Patent: May 15, 1990

[54] VAPOR CONTROL INSULATION BLANKET

[75] Inventor: Merle E. Liskey, Belleville, Mich.

[73] Assignee: Chrysler Corporation, Highland Park, Mich.

[21] Appl. No.: 299,210

[22] Filed: Jan. 23, 1989

[51] Int. Cl.$^5$ .............................................. B01D 53/04
[52] U.S. Cl. ........................................ 55/267; 55/387; 55/527
[58] Field of Search ................. 55/316, 387, 524, 269, 55/267, 527

[56] References Cited

U.S. PATENT DOCUMENTS

| | | | |
|---|---|---|---|
| 3,019,127 | 1/1968 | Czerwonka et al. | 55/524 X |
| 3,728,846 | 4/1973 | Nilsson | 55/316 X |
| 4,046,939 | 9/1977 | Hart | 55/524 X |
| 4,367,079 | 1/1983 | Wallsten | 55/387 X |
| 4,381,929 | 5/1983 | Mizuno et al. | 55/316 |
| 4,504,290 | 3/1985 | Pontius | 55/316 |
| 4,727,955 | 3/1988 | Honda | 55/387 |

Primary Examiner—Charles Hart
Attorney, Agent, or Firm—Kenneth H. MacLean, Jr.

[57] ABSTRACT

A vapor recovery canister comprises a flexible envelope defining a chamber which contains an insulating material impregnated with hydrocarbon adsorbent. Nipples connect the chamber in fluid communication with the exterior of the envelope so that the vapor canister can easily be coupled to the fluid conduits of a vapor recover system. Preferably, the envelope includes a plurality of openings extending through the body of the canister and sealed by sealing grommets to form mounting apertures adapted to receive a snap fit fastener attached to a body panel of a motor vehicle. Preferably, the vapor canister is mounted to the interior surface of the hood panel of the motor vehicle so that engine heat can be utilized to release hydrocarbons stored in the vapor recovery canister.

4 Claims, 1 Drawing Sheet

VAPOR CONTROL INSULATION BLANKET

BACKGROUND OF THE INVENTION

I. Field of the Present Invention

The present invention relates generally to receptacles for the storage of hydrocarbon vapors, and more particularly to such a receptacle in the form of an insulation blanket adapted to be mounted to a motor vehicle panel.

II. Description of the Prior Art

It is well known that fuel used in internal combustion engines such as gasoline is very volatile and easily vaporizes. Of course, such vaporization is important since the vaporized fuel is injected or otherwise aspirated into the engine cylinders where combustion occurs. Nevertheless, vaporization which occurs naturally under normal atmospheric conditions and temperatures has been considered undesirable not only due to the potential for explosion during the handling of the fuels, but also because the hydrocarbon vapors are considered to be harmful pollutants. Thus, it has been desirable to restrict the release of the hydrocarbon vapors to the atmosphere. Moreover, in the interest of conserving fuel energy, vapor recovery systems have been utilized in motor vehicles.

One previously known vapor recovery system is shown in U.S. Pat. No. 3,884,204 to Krautwurst et al. In that system, a first vapor recovery circuit includes an air purged canister filled with vapor adsorbtive material which is connected to a ported vacuum connection in the carburetor. The patent discloses a rigid canister whose interior is filled with an active vapor adsorbing material such as activated charcoal. In addition, the patent teaches a second vapor recovery circuit including a second canister connected in fluid communication with the filler neck of the fuel tank. The patent teaches that the use of two separate canisters is advantageous over the use of a single large capacity canister, since the canisters can be purged at different rates to avoid adverse engine operation or increased exhaust emissions of unburned hydrocarbons. Nevertheless, such a system requires that space be provided for the two separate canisters and thus increases the difficulty of packaging the system within a motor vehicle.

Moreover, in view of the fact that there has been increases interest in controlling the emission of fuel vapors during refueling of the motor vehicle, the previously known canisters adapted to store vapors emitted in the fuel tank of the vehicle are insufficient to control the large amount of vapors which are released during refueling of the vehicle. Thus, U.S. Pat. No. 4,058,147 to Stary et al., discloses a vapor recovery system adapted to be employed at the pumping station where refueling occurs. However, such a system is not adapted to be incorporated in a motor vehicle itself, and it is therefore effective only when a particular pumping station, which is specially constructed with the recovery system, is used to supply fuel to a motor vehicle. Thus, previously known vapor recovery systems do not teach or suggest a means for compactly fitting a large capacity vapor adsorption canister in existing motor vehicle configurations.

SUMMARY OF THE PRESENT INVENTION

The present invention overcomes the above-mentioned disadvantages by providing a vapor adsorption canister in the form of an insulation blanket. The receptacle can be substantially the same size as previously known insulation blankets which cover the inner surface of the hood panel covering the engine compartment or other body panel in the vehicle. Moreover, the canister can be made flexible so as to conform with the shape of the panel, although the canister resists collapsing even when subjected to a vacuum used to purge the hydrocarbon vapors stored therein.

The canister generally comprises an envelope defining an enclosed chamber and an insulation layer enclosed within the envelope which is impregnated with a hydrocarbon adsorbent. In addition, conduit connector means for interconnecting the chamber in fluid communication with at least one source of vapor adsorbate is included with the canister. The insulation layer separates the peripheral walls of the envelope even when the chamber is subjected to a vacuum as when the vapors are purged from the storage canister for introduction into the carburetor or other injection device. In the preferred embodiment, the envelope is flexible along with the insulation layer so that the canister can easily be shaped to conform with any body panel within a motor vehicle. Furthermore, the flexible blanket includes a plurality of opening sealed by grommets to permit the insertion of prong retainers to hold the blanket in a fixed position on the panel.

Since the canister of the present invention can be made to conform with the body panel throughout a wide area, the envelope can enclose a large volume of adsorbent, and thus is capable of adsorbing a large amount of hydrocarbon vapors. However, the canister takes up substantially less available space within the motor vehicle than previously known rigid walled canisters. Moreover, the canister can be used with a wide variety of vapor recover or circulation systems. In addition, the insulation layer can be used to retain noise or heat within a confined area of the vehicle and prevents collapsing of the envelope even when suction is applied to the chamber defined by the envelope. In addition, since the canister can cover a large surface area, the invention is particularly well adapted for use in the engine compartment of the vehicle. Moreover, such a mounting of the blanket canister of the present invention enables the heat to be effectively utilized to release the hydrocarbon vapors from the adsorbate for induction.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which.

DETAILED DESCRIPTION OF A PREFERRED EMBODIMENT OF THE PRESENT INVENTION

Figure 1:
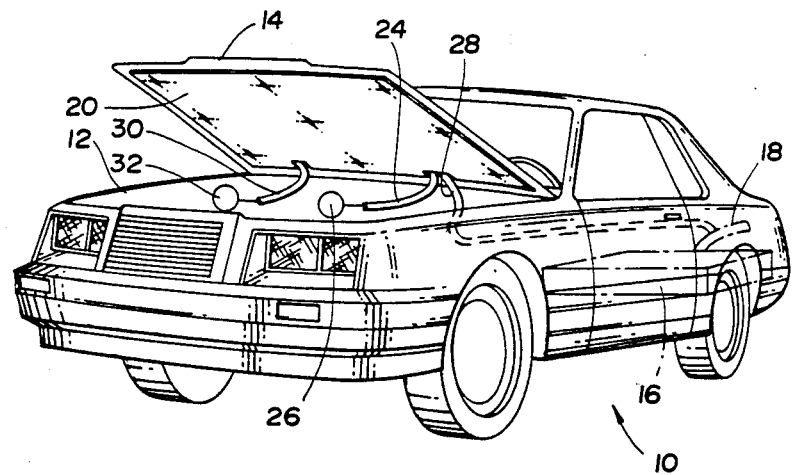
FIG. 1 is a perspective view of a motor vehicle showing the vapor canister of the present invention mounted to the hood inner panel.

Referring first to FIG. 1, a motor vehicle 10 is thereshown including an engine compartment 12 which is enclosed at its upper end by a hood 14. The hood 14 is hinged in a well known manner to provide access to the engine compartment, the engine and other components located therein. The vehicle 10 also includes a fuel tank 16 mounted at the rear of the vehicle connected in fluid communication with the carburetor or other fuel injection device by appropriate means (not shown). The fuel tank 16 includes a filler neck 18 with a removable cap (not shown) so that fuel can be supplied to the fuel tank 16.

As shown in FIG. 1, a vapor canister 20 according to the present invention secured to the interior surface of the hood 14. The canister 20 defines a chamber 22 (FIG. 2) and includes conduit connector means such as nipples 21 (one shown in FIG. 2) which provide fluid communication between the chamber 22 and the exterior of the canister 20. In the preferred embodiment, a first conduit 24 is coupled at one end to one of the nipples 21 and in fluid communication with a fuel chamber of a carburetor indicated diagrammatically at 26. Another nipple 21 is coupled to one end of another conduit member 28 which is connected at its other end in fluid communication with the fuel neck 18 at the rear of the vehicle 10.

Although suction at the carburetor chamber 26 can be used to draw vapor from the vapor canister 20 as well as from the fuel neck 18, it is also within the scope of the present invention to utilize the canister 20 in other forms of vapor circulation systems. For example, a vacuum or pump source 32 apart from the carburetor can be coupled through an additional conduit line 30 communicating with the chamber 22 in the vapor canister 20. Pump source 32 can be in the form of a reversible pump which draws vapor from the carburetor and the fuel neck into the vapor canister 20 so that the hydrocarbon vapors are adsorbed before the air passes to the atmosphere through the conduit 30 and pump 32. Alternatively, the pump 32 can provide fresh air under pressure into the canister 20 through the conduit 30 to thereby inject stored hydrocarbon vapor back to the induction system throttle body through the conduit 24. Of course, with such connection, the conduit 28 will be provided with a one-way valve to prevent vapors from flowing in the direction toward the fuel neck 18. Alternatively, the conduit connector means of the canister 20 can also be supplied with valves as necessary.

Nevertheless, regardless of the type of vapor recovery system employed, the canister 20 of the present invention is easily coupled to fluid conduits of the vapor recovery circuit.

Figure 2:
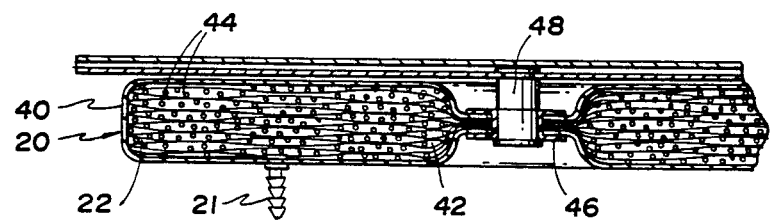
FIG. 2 is an enlarged sectional view showing details of the construction of the vapor canister shown in the FIG. 1.

Referring now to FIG. 2, the vapor canister 20 is thereshown comprising an envelope 40 made of a nonporous material such as flexible plastic. At least one layer of insulating material 42 such as fibrous fiberglas insulation, synthetic foam or the like is enclosed within the envelope 40 to substantially fill the entire envelope. The insulation layer 42 is impregnated with charcoal granules as shown at 44 throughout the entire chamber 22.

A means for attaching the vapor canister 20 to the hood 14 can be integrally formed with the canister 20 by perforating the liner 20 and sealing the perforation with a sealing grommet 46. The sealing grommet 46 includes a central aperture adapted to receive a snap-fit retainer prong 48 adapted to be installed on the hood 14. A plurality of such prongs 48 can be mounted to the hood in registration with a plurality of grommet sealed openings so that the vapor canister 20 is easily retained against the interior surface of the hood panel 14.

Since the vapor canister 20 is filled with an insulating material, and can cover substantially the entire expanse of the hood 14 or other body panel, it will be understood that the vapor canister 20 of the present invention can easily be installed in place of previously known insulation blankets installed on vehicle hoods or other body panels. Thus, the seal grommets can be installed at positions which correspond with the positions of mounting pins previously used for attachment of a previously known insulation blanket, and they are preferably dimensioned for engagement with the same pins. Moreover, the insulating material 42 serves to separate and prevent collapse of the peripheral walls of the envelope 40 even when the chamber 22 is subjected to suction through one of the conduits of the vapor recovery circuit. Moreover, the canister 20 remains flexible and can be shaped to conform with the shape of any body panels in the vehicle 10.

Nevertheless, it is to be understood that the hood mounting shown in FIG. 1 is especially advantageous for the reason that the heat generated by the engine can be used to promote release of hydrocarbons deposited upon the charcoal granules 44 impregnated in the insulation 42. In particular, since the vapor canister 20 includes a large surface area, a large amount of the heat generated by the engine can be absorbed by the canister to cause release or revaporization of the adsorbed hydrocarbon. Moreover, such a construction provides a vapor canister having a large volume without occupying a substantial amount of space within the confines of a motor vehicle. Nevertheless, it is to be understood that such a canister can also be positioned in a wide variety of areas outside the engine compartment 12 of the motor vehicle 10.

Having thus described the present invention, many modifications thereto will become apparent to those skilled in the art to which it pertains without departing from the scope and spirit of the present invention as defined in the appended claims.

What is claimed is:

1. A combination insulation blanket and fuel vapor storage envelope for mounting in overlying relationship to any large planar surface of a vehicle, the envelope having spaced walls of vapor impermeable and flexible material, the walls being edge sealed to define a thin enclosure between the walls; a layer of insulative material within the enclosure which separates and supports the walls apart from one another, the insulative material being permeable to air and fuel vapor; a fuel vapor absorbent material carried by the insulative material for storage of fuel vapors; means for fluidly connecting the enclosure with at least one source of fuel vapor adsorbate.

2. In a vehicle with an engine compartment partially defined by a hood closure which has a planar interior surface partially defining the engine compartment, a combination insulation blanket and fuel vapor storage envelope adapted to overlie the planar interior surface of the closure, the envelope having spaced walls of vapor impermeable and flexible material, the walls being edge sealed to define a thin enclosure between the walls; a layer of insulative material within the enclosure which separates and supports the walls apart from one another, the insulative material being permeable to air and fuel vapor; a fuel vapor absorbent material carried by the insulative material for storage of fuel vapors; means for fluidly connecting the enclosure to at least one source of fuel vapor adsorbate.

3. The combination insulative blanket and fuel vapor storage envelope set forth in claim 2 including means to attach the envelope in overlying relationship to the interior surface, the attachment means including at least one opening aligned through both walls of the envelope with aligned edge peripheries of the opening sealed together to prevent leakage into or from the enclosure.

4. The combination set forth in claim 3 in which a grommet extends through the opening and has laterally extending portions overlying the outer edge peripheries of each wall to clamp the walls and insulative material therebetween tightly together in sealing relationship.

* * * * *